Figure 1:
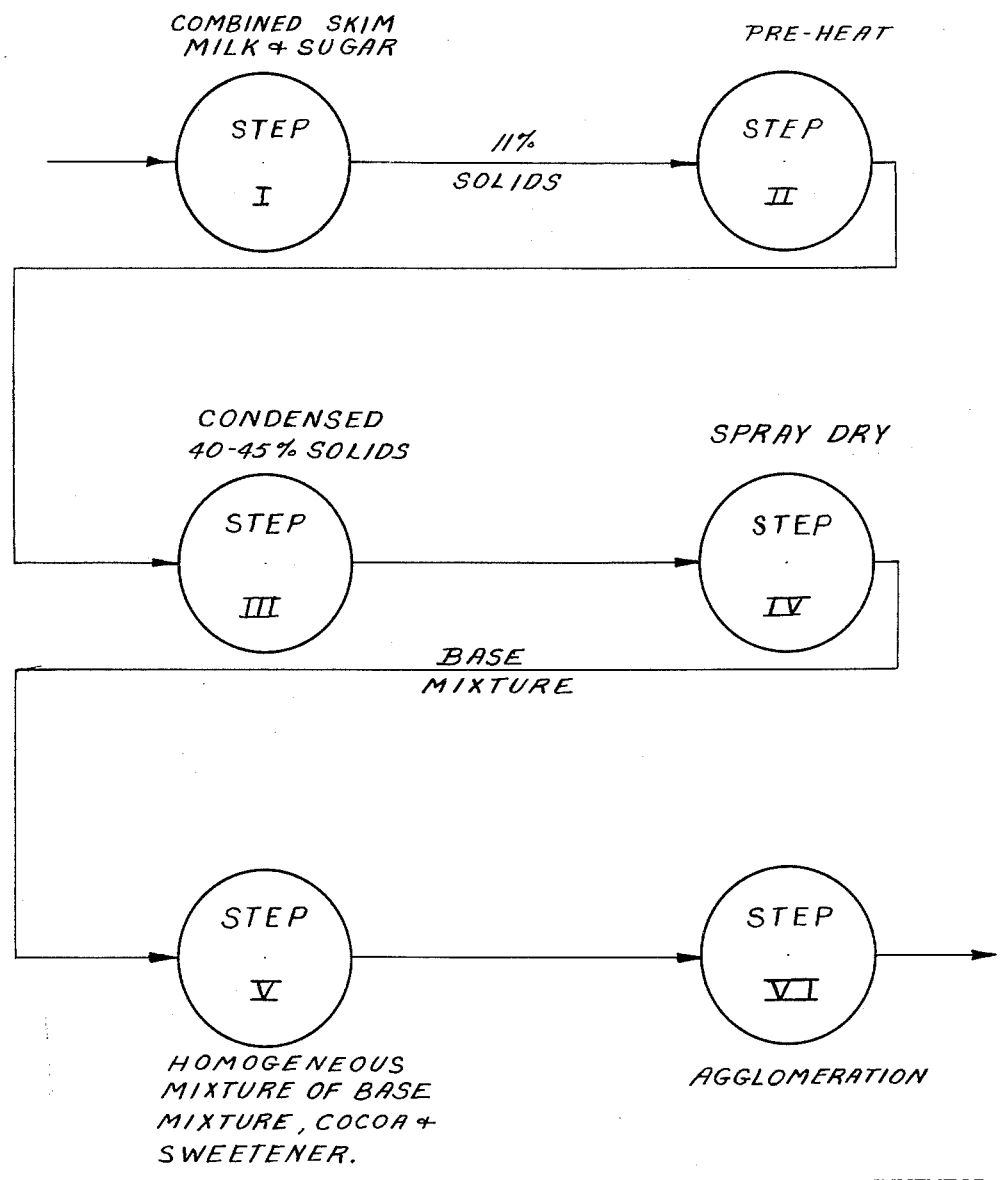

March 27, 1962

D. R. SHENKENBERG
PROCESS FOR THE MANUFACTURE OF A
CHOCOLATE FLAVORED POWDER 3,027,257

Filed Oct. 23, 1959

2 Sheets-Sheet 2

INVENTOR
DAVID R. SHENKENBERG

BY Cushman, Darby & Cushman

ATTORNEYS

United States Patent Office 3,027,257
Patented Mar. 27, 1962

3,027,257
PROCESS FOR THE MANUFACTURE OF A
CHOCOLATE FLAVORED POWDER
David R. Shenkenberg, Cincinnati, Ohio, assignor to The
Kroger Co., Cincinnati, Ohio, a corporation of Ohio
Filed Oct. 23, 1959, Ser. No. 848,370
13 Claims. (Cl. 99—24)

The present invention generally relates to a new method for producing an improved chocolate flavored powder essentially of skim or whole milk, cocoa and a sweetener, and to the improved chocolate flavored powder resulting therefrom. More specifically, the invention relates to low density agglomerates essentially of skim milk, cocoa and sugar, said agglomerates having been produced as to be readily reconstituted, when combined with water, to a so-called "instant chocolate flavored drink."

In particular, it should be noted that the invention represents a novel and radical departure from former "instant chocolate flavored drink" processes and products. Specifically, the powder subjected to agglomeration is a dry homogeneous mixture of (1) a spray dried mixture essentially of skim milk and sugar (hereinafter called a "base mixture"), and (2) cocoa and a sweetener. In other words, contrarary to present techniques, a substantial amount of the sweetener necessary for the final chocolate flavored product, is spray dried with the skim milk to form the aforementioned base mixture. The remainder of the sweetener as well as the cocoa are dry mixed with this base mixture to yield the powder to be agglomerated.

Such method results in a low density product which is very desirable from a marketing standpoint. Also, the inclusion of a portion of the sweetener in the skim milk prior to spray drying materially assists proper agglomeration thus enhancing ready reconstitution of the final product.

Furthermore, the fact that all of the cocoa is dry mixed with the base mixture, rather than being subjected to high temperature treatments, is important. This prevents undesirable dissipation of natural volatile complex compounds which contribute to the flavor characteristics of the final "instant" chocolate flavored drink. Also, the entire process becomes more appealing from a commercial standpoint as will be more fully noted hereinafter.

Various methods are now being utilized for the preparation of a product capable of being reconstituted with water to yield an "instant" chocolate flavored drink. Typically, a quantity of skim milk or skim milk powder is combined in aqueous solution with cocoa and a minor amount of sugar, then condensed, and spray dried. To the spray dried mixture is added skim milk powder and the major portion of sugar. The entire mixture is then agglomerated.

Disadvantages possessed by the foregoing process include (1) a relatively higher density end product is obtained, (2) adding all or substantially all of the sweetener after spray drying prevents optimum agglomeration, (3) heating and spray drying the cocoa adversely affects the flavor of the final agglomerated product, and (4) in commerical application, spray drying the cocoa results in greater production losses, more difficult and costly cleaning operations, and increased equipment wear. This is due to the very nature of the cocoa.

Another method presently being used to produce a chocolate flavored drink powder comprises dry mixing cocoa, skim milk solids, and a sweetener plus other conventional additives, and then agglomerating. A high density end product less readily reconstituted, is obtained.

The advantages obtained by my process can best be explained by the fact that a two step addition of sweetener avoids undue crystallization or formation of large, hard, relatively insoluble candy-like particles in the end product. By agglomerating a homogeneous mixture of base mixture, cocoa and sweetener, as described heretofore, the aforementioned adverse effects are entirely obviated and crystallization is thereby controlled as to yield low density agglomerates of a porous and relatively fluffy nature capable of being quickly reconstituted in water.

With the above in mind, the primary object of this invention is to provide a process for the manufacture of a low density chocolate flavored powder, which is readily reconstituted with water into an "instant" chocolate flavored drink.

Another object of this invention is to provide an instant chocolate flavored drink powder of low density and high stability which yields better flavor as well as substantially instantaneous solubility upon reconstitution with water.

A further object of this invention is to provide a process for the manufacture of a low density chocolate flavored powder which is readily reconstituted with water into an "instant" chocolate flavored drink, said process comprising heating a quantity of skim or whole milk sufficiently to improve stability and agglomerating characteristics thereof, condensing said preheated milk by evaporation, adding a substantial portion of sugar to said milk either before or after the preheating and condensation steps thereby forming a base mixture, spray drying said base mixture, homogeneously mixing said spray dried base mixture with cocoa and additional sweetener, and thereafter forming agglomerates of said homogeneous mixture.

An additional object of this invention is to provide a process for the manufacture of a low density chocolate flavored drink powder as noted heretofore wherein the cocoa utilized is vitamin enriched and contains a small amount of a wetting agent.

Still another object of this invention is to provide a low density chocolate flavored drink powder which is readily reconstituted with water into an "instant" chocolate flavored drink, said powder being in the form of agglomerates.

Other and further objects of the invention will be in part apparent and in part set out in the detailed description of the several steps in the process which follows.

Figure 2:
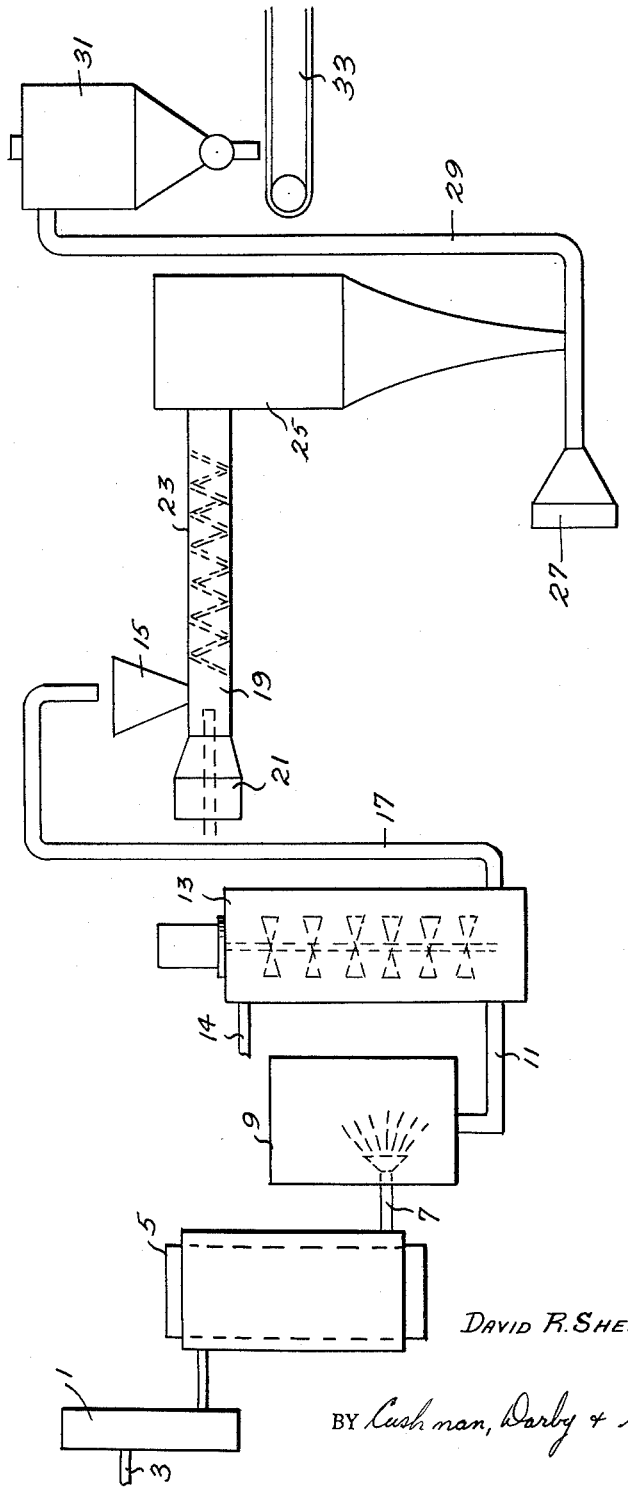

Referring to the accompanying drawings:

FIGURE 1 illustrates a flow diagram of the preferred sequence of steps comprising the process; and FIGURE 2 illustrates one form of apparatus for utilization of my invention.

Referring to FIGURE 1, a given amount of milk typically skim milk, is combined with sugar as noted in step I. The skim milk solids and sugar are in proportion of 70–75% skim milk solids to 25–30% sugar, with the skim milk being in liquid form and of milk solids content ranging from 7.5 to 10%. Sucrose is normally used as the sugar component because of its ready availability, although other types of sugar such as glucose or fructose might be used, at least in part.

In step II, the skim milk and sugar mixture, which is about 11%–12% solids content, may be heated at about 165–210° F. for a short time ranging up to about 15 minutes. This pre-heating step is designed to improve stability and agglomerating characteristics of the mixture, as well known in the art.

Referring to step III of FIGURE 1, the sugar and skim milk mixture is then condensed by standard flash evaporation techniques under vacuum and at conventional temperatures of between 110 and 165° F., to achieve a solids content of between about 40 and 45%.

It should be emphasized that the sugar can as readily be comibned with the skim milk after the latter is preheated and condensed. The same proportion ranges are contemplated but the pre-heat and condensing temperature-time relationships might vary slightly in accordance with standard practice as to compensate for any natural variations in the skim milk.

The condensed mixture is then spray dried in step IV, using conventional techniques as by means of a suitable spray drier. These various steps yield a "base mixture" of skim milk solids and sugar.

In step V, the base mixture is homogeneously mixed with cocoa and additional sweetener. The cocoa is normally vitamin enriched and the sweetener is typically sugar, e.g., sucrose, glucose or fructose, for reasons noted heretofore, but other sweeteners can be used if desired.

The proportions of base mixture to cocoa and sweetener can vary, but normally constitute about 60 to 70% base mixture, 10 to 15% cocoa, and 15 to 25% sweetener, by weight of total composition. It should be stressed that these relative proportions are determined by conventional standards of flavor and sweetness, and are generally known to the art. The sugar in the base mixture, in every case, is more than 25% of the total sweetener present in the homogeneous mixture of base mixture, cocoa, and added sweetener, preferably being more than 33%. The total sweetener in the homogeneous mixture can vary from about 30% to 45% of total composition.

It is desirable to add small amounts of a stabilizer, e.g., vegetable gum; a wetting agent, e.g., lecithin; vitamins; and flavoring, e.g., vanillin, to the homogeneous mixture of step V.

Known agglomerating apparatus is used in my process, as illustrated in FIGURE 2. The apparatus utilized will be clearly described hereinafter with regard to a specific example, but is generally summarized as follows.

The homogeneous mixture is contacted with a high velocity, highly humid stream of air whereby the powder particles are wetted sufficiently to cluster. The wetted and clustered powder is fed through an agglomerating section to a collector and dried wherein it is dried to a desired moisture of between about 2.8 and 3.6%. The dried clusters are then passed to cooling and separating zones yielding a dried agglomerated end product having a density of from about 30 to 35 grams per 100 ccs., with 32 grams per 100 ccs. being optimum.

It can be appreciated that the foregoing process is subject to variation, particularly as to temperature, time of treatment, and relative quantities of compounds used. These actually depend upon desirability of achieving a commercially practical process and upon the ultimate flavor desired for the end product after reconstitution. Such are governed by accepted and conventional standards in the art.

As noted heretofore, the advantages possessed by the product resulting from my described process include (a) a low density product which is advantageous from a merchandising standpoint; (b) a more readily soluble product capable of substantially instant reconstitution with water; and (c) a more stable product having desirable flavor characteristics upon reconstitution.

A highly dense product must be usable by the housewife in very small quantities to obtain the desired concentration in the reconstituted drink. However, in practice, it has been found that the user of these products measures out a "teaspoon full" regardless of the directions on the package. Accordingly, effects have been made to produce a product of lower density but having superior drink characteristics than those presently on the market.

It was not until the process described herein was developed and including the use of a "base mixture," that the appropriate density characteristic was achieved. In addition, as compared to present day processes which dry mix substantially all of the sweetener just prior to agglomeration and which subject cocoa to spray drying and/or other steps requiring heat treatment, my novel use of a spray dried "base mixture," which is then homogeneously mixed with cocoa and sweetener, makes possible an end product that not only possesses desirable density characteristics, but successfully combines this with better flavor, as well as faster solubility upon reconstitution with water, to wit, better flavor principally by the withholding of cocoa from the base mixture, and speedier solubility by apportioning a substantial part of the total sweetener to the base mixture and the remainder to the homogeneous mixture that follows spray drying.

The latter phenomenon of better reconstitution has been explained to be due to the fact that the introduction of all of the sweetener to the mixture just before agglomeration would lead to adverse crystallization or formation of large, hard, relatively insoluble candy-like particles. These detrimental side effects are adversely reflected in the agglomeration step, since the final agglomerates possess undesirable physical characteristics which detract from their ability to dissolve in water. This inability to dissolve is demonstrated by the tendency of the particles to be present as sticky lumps when intermixed with cold water.

Evidently, the spray drying of part of the sweetener in the base mixture inhibits the tendency to crystallize or form the candy-like particles. In this way, I decrease the amount of untreated sweetener available in the agglomerator, which sweetener is susceptible to crystallization and primarily determines the degree of formation of candy-like particles in the agglomerates. Thus, the final agglomerates possess the desired porosity and relatively fluffy nature yet without sacrificing the desired flavor characteristics.

Referring to FIGURE 2, one form of apparatus is illustrated and can be used in my invention with standard mixing condensing, spray drying, and agglomerating equipment. Combined skim milk and sugar of step I are introduced in the preheater 1 through the inlet 3. The preheated liquid is then introduced into condenser 5 which is nothing more than a steam jacketed evaporator well known in the art. The preheated skim milk and sugar are then condensed by evaporation to desired solids content as noted heretofore. The condensed liquid is withdrawn through outlet 7 and passed into a conventional spray drier which is generally shown as 9 in the drawing. Of course, the sugar can be added to the skim milk after pre-heating and condensing.

The spray dried material comprising the "base mixture" is withdrawn from the spray drier at 11, and introduced into mixer 13. Cocoa and sweetener of desired amounts also enter the mixer at 14. After the combination of base mixture, cocoa and sweetener has been homogeneously mixed in mixer 13, the homogeneous mixture is fed to a hopper 15 through outlet 17, thus entering the agglomerating phase of the process.

The homogeneous mixture is then fed from the hopper 15 into a zone 19 of high velocity, highly humid air. This zone results from a combination of air and steam entering the system at 21.

The particles from the hopper 15 are thus wetted and caused to cluster in the agglomerating section 23. From the agglomerating section 23, the clusters are fed to collector 25 in which separation from the air stream takes place.

The wetted and clustered powder then falls freely to the bottom of the collector 25 and is picked up by a high velocity stream of hot air entering the system at 27. Drying substantially completely occurs in the vertical tube 29 to the desired moisture content. From the vertical tube 29, the dried clusters pass into collector 31 and from there to screen 33 through which cooling air is passed to cool the final agglomerated product.

The agglomerates can then be sized by use of suitable apparatus such as stainless steel rolls (not shown). This provides particles of uniform size for packaging purposes.

The final product possesses a low density; it disperses faster upon reconstitution with water; and it yields a better flavor on reconstitution.

My invention is more fully illustrated by the following specific examples.

Example I

Liquid skim milk in an amount of about 700 pounds and having a skim milk solids content of about 8.8% was mixed with 26.5 pounds of sucrose and then heated at about 170° F. for approximately 15 minutes. The sucrose and skim milk mixture was condensed in a conventional double effect evaporator at temperatures of about 160° F. and 120° F. until a solids content of 42% was achieved.

The condensed mixture was spray dried in accordance with standard procedure and using a conventional spray drier to yield 91 pounds of a "base mixture."

The base mixture was then homogeneously mixed with 16.6 pounds of vitamin enriched cocoa and additional sucrose in the amount of 21.2 pounds. The homogeneous mixture was analyzed as follows:

|  | Percent |
|---|---|
| Skim milk solids | 49.0 |
| Cocoa | 12.5 |
| Sucrose | 36.0 |
| Water | 2.5 |

To the above were added small quantities of lecithin and a vegetable gum to enhance wettability and stability, respectively.

The resulting homogeneous product was then agglomerated in accordance with the known procedure described heretofore and with particular reference to FIGURE 2. The final product possessed a density of about 32 grams per 100 ccs. and exhibited optimum solubility and flavor characteristics upon reconstitution with water.

Example II

The procedure of Example I is carried out, except that the liquid skim milk is first pre-heated to a temperature of 175° F. for 10 minutes and then condensed at temperatures of about 160° F. and 120° F. to a solids content of 32.5%. To this is added 26.5 pounds of sucrose and the remainder of the process as in Example I is carried out yielding a similar end product.

Example III

The procedure of Example I is carried out, except that a combination of sucrose and glucose is utilized in the formation of the base mixture as well as in the homogeneous mixture resulting from the combination of base mixture, cocoa and sugar. The end product exhibited characteristics similar to those obtained in Example I.

Example IV

Liquid skim milk in an amount of about 650 pounds and having a skim milk solids content of about 8.8% is mixed with 30 pounds of sucrose and glucose, and then heated at about 170° F. for approximately 15 minutes. The sucrose, glucose and skim milk mixture is condensed in a conventional double effect evaporator at temperatures of about 160° F. and 120° F., until a solids content of 42% is achieved.

The condensed mixture is spray dried in accordance with standard procedure and using a conventional spray drier to yield 91 pounds of a "base mixture."

The base mixture is then homogeneously mixed with 15 pounds of vitamin enriched cocoa and additional sucrose in the amount of 20 pounds. The homogeneous mixture is analyzed as follows:

|  | Percent |
|---|---|
| Skim milk solids | 46.0 |
| Cocoa | 12.0 |
| Sucrose and glucose | 40.0 |
| Water | 2.0 |

To the above are added small quantities of lecithin and a vegetable gum to enhance wettability and stability, respectively.

The resulting homogeneous product is then agglomerated in accordance with the known procedure described heretofore and with particular reference to FIGURE 2. The final product possessed a density of about 32 grams per 100 ccs. and exhibited optimum solubility and flavor characteristics upon reconstitution with water.

With regard to the foregoing description of my invention, it should be noted that the terms "chocolate" and "cocoa" are applied to a variety of chocolate flavored products derived from the cacao bean. Also, the fat content of the cocoa employed is subject to variation depending upon the characteristics desired in the final product. In this respect, fat content can likewise be varied by the addition of other vegetable or animal fats.

Throughout this specification, I have emphasized the applicability of my novel process to the production of a chocolate flavored drink. However, the process is equally applicable to the production of a chocolate milk powder by the use of whole milk in place of part or all of the skim milk.

As noted heretofore, although preferred ranges of temperature, time, concentration, proportions, and the like have been set forth, broader ranges are many times contemplated as conventional in the art. It must be understood that the invention is not limited to preferred ranges so long as the desired results are effected. The invention includes all variations in procedures covered by the appended claims and their equivalents.

I claim:

1. A process for the manufacture of a low density chocolate flavored powder which is readily reconstituted with water, said process comprising preheating a quantity of milk sufficiently to improve stability and agglomerating characteristics thereof, condensing said milk by evaporation, combining a substantial portion of sugar with the milk, spray drying the combined sugar and milk to form a dry base mixture, then homogeneously mixing said spray dried base mixture with cocoa and a sweetener, and thereafter forming agglomerates of said homogeneous mixture, wherein the sugar that is combined with the milk to form said base mixture comprises more than 25% of the total sweetener present in the homogeneous mixture of base mixture, cocoa and added sweetener.

2. A process as claimed in claim 1 wherein said substantial portion of sugar is first combined with the milk and thereafter the combined sugar and milk are pre-heated and condensed.

3. A process as claimed in claim 1 wherein said milk is first pre-heated and condensed and the substantial portion of sugar is then added thereto.

4. A process as claimed in claim 1 wherein said milk is liquid skim milk and wherein the skim milk and sugar are mixed in proportions of 70–75% skim milk solids to 25–30% sugar, said skim milk having a milk solids content of between 7.5 and 10%.

5. A process for the manufacture of a low density chocolate flavored drink powder which is readily reconstituted with water into an "instant" chocolate flavored drink, said process comprising mixing a quantity of liquid skim milk with a substantial portion of sugar, pre-heating said skim milk and sugar sufficiently to improve stability and agglomerating characteristics thereof, condensing said skim milk and sugar by evaporation, spray drying the combined skim milk and sugar to form a dry base mixture, then homogeneously mixing said spray dried base mixture with cocoa and a sweetener, and thereafter forming agglomerates of said homogeneous mixture, wherein the sugar that is combined with the milk to form said base mixture comprises more than 25% of the total sweetener present in the homogeneous mixture of base mixture, cocoa and added sweetener.

6. A process as claimed in claim 5 wherein said skim milk and sugar are mixed in proportions of 70–75% skim milk solids to 25–30% sugar, said skim milk having a milk solids content of between 7.5 and 10%.

7. A process as claimed in claim 5 wherein said skim milk and sugar are pre-heated at a temperature of between 165 and 210° F. for a time period of up to about 15 minutes.

8. A process as claimed in claim 5 wherein said skim milk and sugar are condensed at a temperature of between 110 and 165° F. to a solids content of between about 40 and 45%.

9. A process as claimed in claim 5 wherein said sugar is selected from the group consisting of sucrose, glucose and fructose.

10. A process as claimed in claim 5 wherein the proportions of dried base mixture to cocoa and sweetener are about 60 to 70% base mixture, 10 to 15% cocoa, and 15 to 25% sweetener, by weight of total composition.

11. A process as claimed in claim 5 wherein small amounts of a stabilizer, wetting agent, and flavoring are added to the homogeneous mixture prior to agglomeration.

12. A process as claimed in claim 5 wherein said cocoa is vitamin enriched.

13. A process for the manufacture of a low density chocolate flavored drink powder which is readily reconstituted with water into an "instant" chocolate flavored drink, said process comprising mixing liquid skim milk having a milk solids content of between 7.5 and 10% with sugar in proportions of 70–75% skim milk solids to 25–30% sugar, pre-heating said skim milk and sugar at a temperature of between 165° and 210° F. for a time period of up to about 15 minutes, condensing said skim milk and sugar at a temperature of between 110° and 165° F. to a solids content of between about 40 and 45%, spray drying the combined skim milk and sugar to form a dry base mixture, then homogeneously mixing said spray dried base mixture with cocoa and a sweetener in proportions of about 60 to 70% base mixture, 10 to 15% cocoa, and 15 to 25% sweetener by weight of total composition, and thereafter forming agglomerates of said homogeneous mixture.

References Cited in the file of this patent
UNITED STATES PATENTS

| | | |
|---|---|---|
| 2,850,388 | Peebles | Sept. 2, 1958 |
| 2,893,871 | Griffin | July 7, 1959 |